Jan. 29, 1935. A. M. DAUERNHEIM 1,989,403
DISPLAY TRAY FOR POTTED PLANTS
Filed March 30, 1933
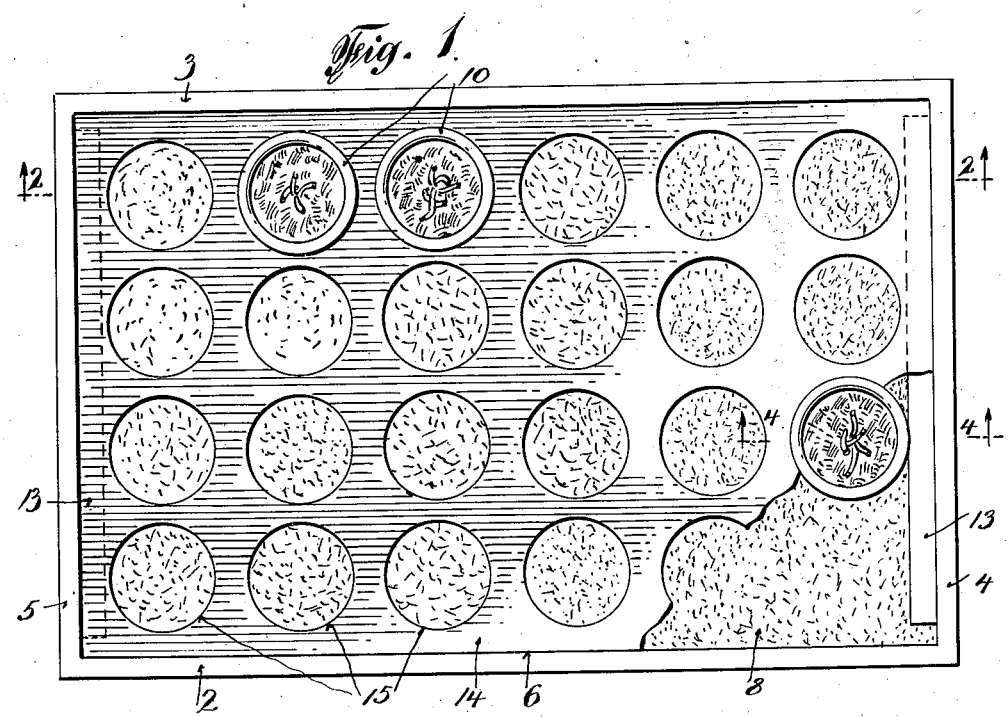
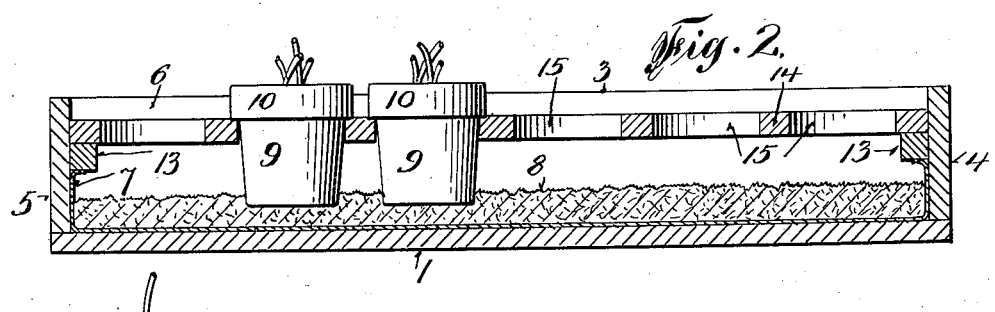
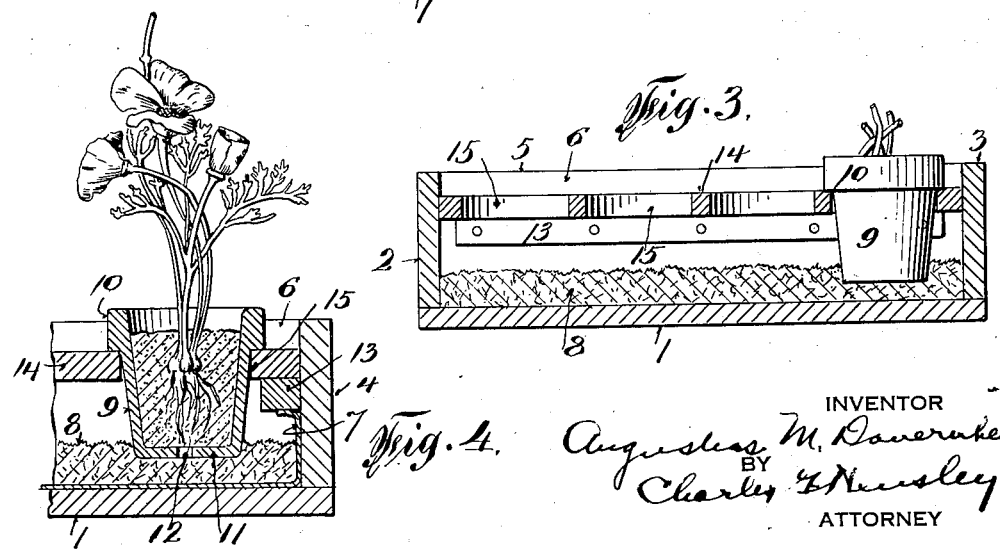
INVENTOR
Augustus M. Dauernheim
BY Charles F. Hensley
ATTORNEY Patented Jan. 29, 1935

1,989,403

UNITED STATES PATENT OFFICE 1,989,403

DISPLAY TRAY FOR POTTED PLANTS

Augustus M. Dauernheim, Brooklyn, N. Y.

Application March 30, 1933, Serial No. 663,468

1 Claim. (Cl. 47—39)

Where potted plants are placed on display for sale in flower shops, stores and other places, it is difficult to keep the plants fresh and salable even though they are potted plants as distinguished from cut flowers, over more than a few days. Especially is this difficult where the plants are small and numerous because the attendant often neglects to supply the plants with sufficient moisture to keep them in fresh and salable condition.

It is the object of the present invention to provide a simple and inexpensive box or tray into which the flower pots containing the plants are adapted to be inserted, preferably in regular rows, so that the flower pots and plants are maintained in an upright position in relation to the box or tray. The box or tray is supplied with a bed of moisture holding material such as peat moss, which will hold a considerable quantity of water to be given up to the plants by absorption or capillary action.

The bed of liquid holding material can be saturated with water at the time the plants are about to be delivered in the trays or boxes to the retailer and the bed of absorbent material will hold a sufficient quantity of water to be gradually given up to the plants so that the latter may be kept in fresh condition over much longer periods than under the present method of keeping plants, in order to give the retailer a long period to dispose of the plants or to permit the retailer to carry a larger stock.

The extra moisture necessary to keep the plants in fresh condition cannot primarily be supplied to the earth within the flower pots but it can be carried by the bed of absorbent material referred to, as a convenient vehicle for holding the extra quantity of water and for delivering this water or giving it up to the earth in the flower pots by capillary action or absorption slowly and over a considerable period of time.

The present invention, therefore, comprises a box or tray having a bed of liquid holding material therein, a partition or member having openings to receive the flower pots therein so that the flower pots rest on the bed of absorbent material in order to permit the latter to give up its moisture gradually to the earth within the flower pots, preferably through the ordinary bottom opening in the flower pots. Other features and advantages will be set forth in the following detailed description of my invention.

In the drawing forming part of this application,

Figure 1 is a plan view partly broken away, showing a box or tray embodying my invention, in which view flower pots containing potted plants are shown in three of the openings in the supporting partition, the remainder of the plants being omitted for simplicity, Figure 2 is a longitudinal sectional view taken on the line 2—2 of Figure 1, Figure 3 is a cross sectional view of my invention, and Figure 4 is an enlarged sectional view taken on the line 4—4 of Figure 1.

The tray or box which forms the principal member in my present invention may be rectangular or any other shape although in the drawing it is shown as rectangular and consisting in part, of the bottom wall 1 the side walls 2, 3, and the end walls 4, 5, all related to each other, to provide a chamber 6 for the purposes hereinafter described.

This tray or box may be made of wood, metal or any other suitable material either by assembling the several walls and attaching them together, or all of the walls may be made integral, especially if the tray or box is stamped from sheet metal. If the box is made of wood I prefer to provide a sheet of wax paper, "Cellophane", or other material 7 shown in Figures 2 and 4 but omitted from Figures 1 and 3 to line the bottom and parts of the sides of the receptacle within which the absorbent material is held, in order to prevent leakage of any excess moisture from the absorbent material.

Within the chamber 6 and resting on the bottom wall and against the side and end walls, I have shown a body 8 of absorbent material which will hold a large portion of water and which will slowly give up water to the plant by capillary or absorption action. I prefer to use peat moss or some similar material for the bed 8 since this material will tend to hold its shape within the receptacle as well as to hold the supply of moisture, and it will readily give up its moisture by capillary action to the earth within the flower pots and to the plants imbedded in this earth.

I have shown several flower pots of the ordinary type, consisting of a tapering body portion 9 with a flange 10 at the upper portion. The bottom wall 11 extending across the bottom end of the flower pot is shown as provided with the usual aperture 12 through which absorption may take place.

Attached to the end walls of the receptacle and below the top thereof, I have shown cleats 13 on which rests a horizontal wall or partition 14.

This partition is provided with a number of apertures 15 extending therethrough, each aperture being adapted to receive therein a body portion 9 of a flower pot with the flange 10 resting against the top surface of the partition, as illustrated in the drawing.

It is preferable to arrange the apertures 15 in regular rows lengthwise and crosswise of the receptacle, as shown in Figure 1, the apertures being spaced apart to separate the individual flower pots.

When the flower pots are lowered through the apertures 15 until the flanges 10 rest on the top surface of the partition 14, the lower ends of the flower pots will extend down to and preferably press slightly into the body of liquid holding material 8 as shown in Figures 2, 3 and 4. Usually there will be one flower pot with its plant or plants arranged in each of the apertures 15. The earth contained in each flower pot may be supplied with as much moisture as it will hold. Also, the bed of material 8 will be supplied with as much moisture as it will hold. In this condition the receptacle with the flower pots and plants will be shipped or delivered to the several retail places where they are put on display with the several flower pots resting on the partition and with their bottom portions resting on and projecting into the bed of material 8. There will be no rapid loss or dissipation of moisture in the bed of material 8 by direct evaporation because the partition 14 with its several apertures 15 closed by the flower pots will prevent direct and rapid evaporation of the moisture held in the bed of material 8. At least this will be the condition until some of the plants are removed from the receptacle as they are sold.

As the moisture is contained in the earth held in the individual flower pots and is absorbed by the plants, the moisture removed from the earth in the flower pots will be gradually replaced by absorption or capillary action by the moisture contained in the bed of material 8. The moisture from the body of material 8 will pass through the central aperture 12 in the bottom of the flower pot.

The moisture will then pass into the earth within the flower pot by capillary action or absorption to supply additional moisture to the plant, thereby maintaining the latter in fresh and salable condition over a much longer period than if the plant depended upon the moisture originally contained in the earth in the flower pot. The moisture contained in the peat moss or whatever material the bed 8 consists of, by being gradually absorbed by the earth in the several flower pots, will be sufficient to keep the plants in fresh and salable condition over a much longer period than heretofore, without requiring special attention for the watering of the plants while they are in the retailer's hands for sale. It is not necessary to continually sprinkle the plants, so that the plants in the receptacles are not necessarily dripping with moisture. Furthermore, when a potted plant is removed from the receptacle it may be instantly wrapped in paper, tinfoil or other material, to be carried away by the purchaser, and without fear of there being such an excess amount of moisture in the flower pot as to cause the purchaser to be annoyed by dripping of moisture from the package. The partition 14 is preferably made to be lifted off the cleats 13 to permit ready access to the body of material 8 for the purpose of spreading and smoothing it and for supplying moisture thereto.

The present device is simple and inexpensive and will materially aid in the retail sale of potted plants.

Having described my invention, what I claim is:

A potted plant display device, including a receptacle adapted for shipping and display purposes and having a compartment, a partition having apertures therethrough for receiving the bottom portions of flower pots therethrough, said flower pots extending downwardly within the receptacle toward the bottom wall thereof, with the flanges of the flower pots resting on the top of said partition, and a bed of moisture holding material arranged in the bottom of said compartment so that the bottoms of the several pots rest against said body of material, said body of moisture holding material adapted to give up its moisture to the earth in the several flower pots in order to renew the supply of moisture in said earth for the purpose set forth.

AUGUSTUS M. DAUERNHEIM.